Sept. 25, 1928.  
C. RUSSO  
1,685,245  
VEGETABLE CUTTER  
Filed May 4, 1925   2 Sheets-Sheet 1

Inventor  
Calogero Russo  
By Kris Hudson & Kent Attorney

Sept. 25, 1928.
C. RUSSO
VEGETABLE CUTTER
Filed May 4, 1925
1,685,245
2 Sheets-Sheet 2
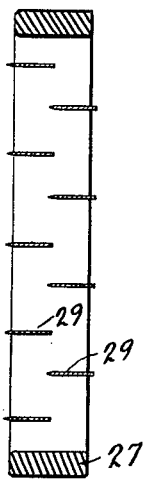
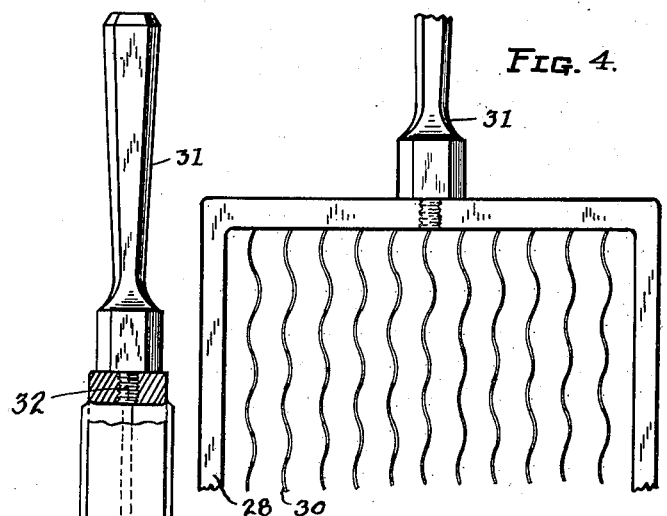
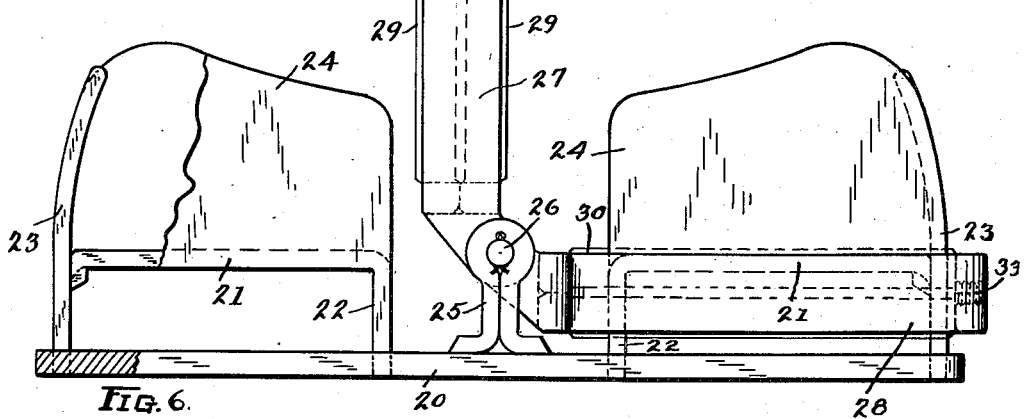
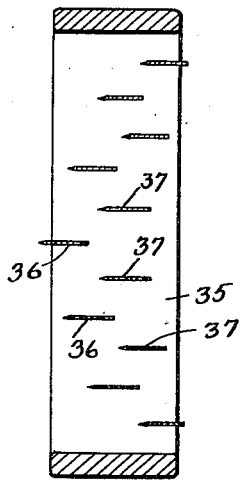
Inventor
Calogero Russo
By Kwis Hudson & Kent
Attorneys Patented Sept. 25, 1928.

1,685,245

UNITED STATES PATENT OFFICE.

CALOGERO RUSSO, OF CLEVELAND, OHIO.

VEGETABLE CUTTER.

Application filed May 4, 1925. Serial No. 27,678.

This invention relates to a vegetable cutter of the type shown in my Patent #1,468,546, granted September 18, 1923, and has for its object to improve the device shown in said patent by providing a cutter which is less expensive to manufacture, which is of more durable construction and which is more convenient to operate.

More specifically it is the object of the present invention to provide a cutter having few parts which can be readily assembled, to provide a more rigid support for the blades and to arrange the cutter in a manner such that they are subject to less strain in the cutting operation, and further to provide a device which can be quickly adjusted for making different cuts.

A further object is to provide an article supporting grating formed of spaced bars between which the cutter blades can pass and from which the slices are ejected by the cutter on the return movement thereof.

A further object is to provide means in connection with the grating which will retain the article thereon during the cutting operation, and which will not interfere with the discharge of the slices.

With the above and other objects in view, the invention may be said to comprise the device as illustrated in the accompanying drawings hereinafter described and particularly set forth in the appended claims together with such variations and modifications thereof as will be apparent to one skilled in the art to which the invention appertains.

Figure 1:
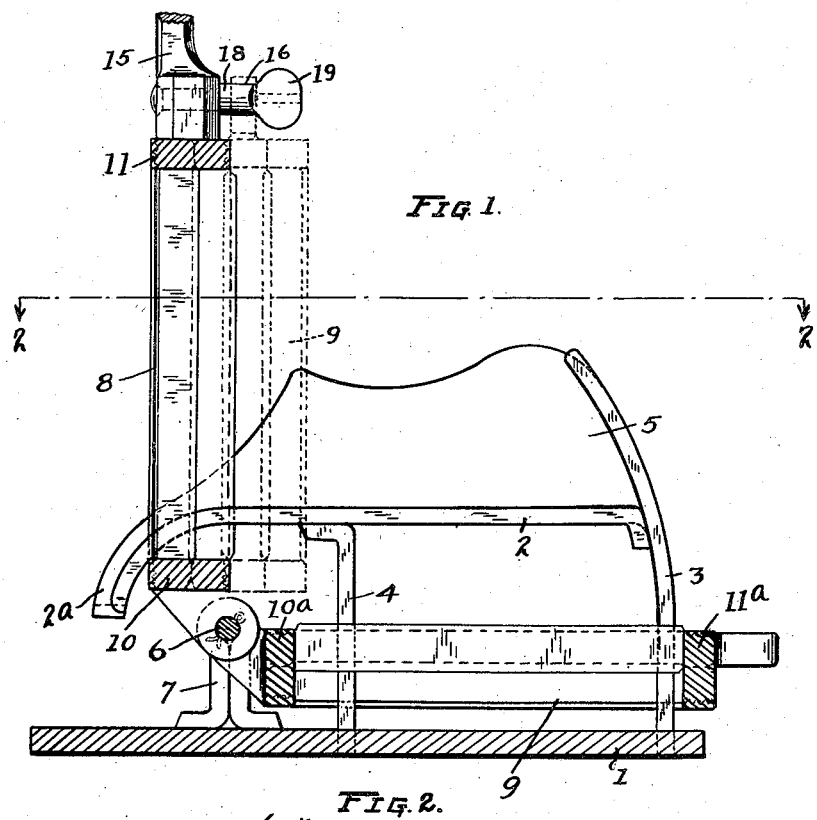
Figure 2:
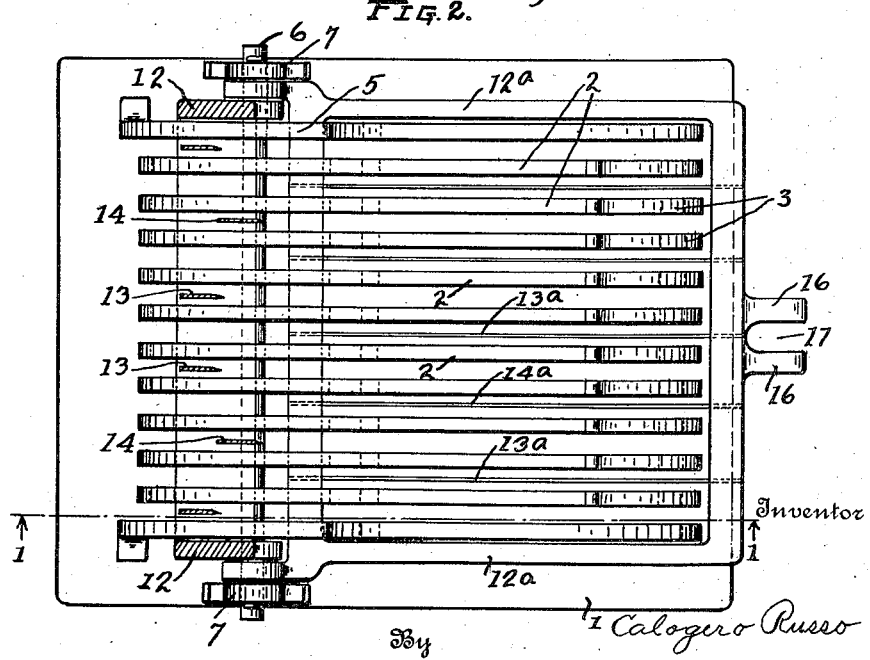

Reference should be had to the accompanying drawings forming a part of this specification in which Fig. 1 is a longitudinal vertical section through the cutter, taken on line 1—1 of Fig. 2, Fig. 2 is a transverse section taken on line 2—2 of Fig. 1. Fig. 3 is a side elevation showing a construction in which article supports are provided upon either side of the cutter so that articles may be cut upon either support. Fig. 4 is a fragmentary front elevation of one of the cutters shown in Fig. 3, the cutter being of wavy form to cut wavy slices. Fig. 5 is a section on line 5—5 of Fig. 3. Fig. 6 is a transverse section through cutter frame showing a slightly modified arrangement of cutter blades.

Referring to Figs. 1 and 2 of the drawings, the cutter is provided with a base 1 adapted to rest upon a table or other support and above the base 1 there is a support for the articles to be cut which is in the form of a grating composed of regularly spaced parallel bars 2. Each of the bars 2 is supported at its forward end by a post 3 which is attached to the base 1, and extends upwardly above the bars 2, the forward ends of the bars being secured to the posts 3. The bars 2 form a flat grating upon which the articles to be cut are placed and the projecting portions of the post 3 above the bars 2, form a retaining wall which prevents the articles from moving off the support during the cutting operation. Rear supporting posts 4 are provided which are secured at their lower ends to the base 1, and at their upper ends to the under sides of the bars 2. Side plates 5 may be provided at opposite sides of the grating formed by the bars 2 to prevent slices from falling off the support after they are cut.

A transverse shaft 6 is supported by brackets 7 above the base 1 and below the bars 2 and on the shaft 6 are pivoted two cutter frames 8 and 9 which carry the cutter blades. The frame 8 has an inner cross bar 10 adjacent the shaft 6 and parallel therewith, an outer cross bar 11 and side members 12 which connect the ends of the cross bars 10 and 11. The inner cross bar 10 is positioned beneath the grating bars 2 which pass through the frame, the side bars 12 are outside the side members 5 and the outer cross bars 11 are at a sufficient distance from the inner cross bars 10 to pass in front of the post 3 when the frame is swung downwardly toward the base 1. Cutter blades 13 and 14 are mounted in the frame 8 and have their opposite ends secured in the inner and outer cross members 10 and 11. These cutter blades are arranged in two rows, the blades 13 of one row being staggered with respect to the blades 14 of the other row and the blades on one of said rows being intermediate of the blades of the other row. The cutter blades are arranged in the spaces between the parallel bars 2, the blades 13 and 14 occupying alternate spaces between said bars. A suitable handle 15 is secured to the outer cross bar 11 and swings about its pivot to cause the blades to swing downwardly through the spaces between the bars 2. The frame 9 is provided with inner and outer cross bars 10ª and 11ª, side bars 12ª and cutter blades 13ª and 14ª corresponding to the frame members and cutter blades of the frame 8. The cutter blades 13ª and 14ª are arranged with respect to each other in the same manner as the blades 13 and 14, but are positioned to occupy the spaces between the bars 2 intermediate those in which the blades 13 and 14 lie. The outer cross bar 11ª of the frame 9 has a pair of outwardly extending lugs 16 which form a slot 17 between them, which is adapted to receive a pin 18 which is secured to the handle 15. The pin 18 is rotatably mounted in the handle 15 and has a wing-shaped head 19 by means of which it may be turned. The two frames 8 and 9 are so constructed and arranged so that the frame member 9 will lie flat against the frame member 8 when the two frames are brought together, with the pin 18 carried by the handle 15 projecting through the slot 17 between the lugs 16. The head 19 is so formed that when in one position the frame member 9 can swing freely into or out of engagement with the frame member 8 and is adapted to be turned to a position in which the head 18 engages the lugs 16 to lock the frame member 9 to the frame member 8. The supporting bars 2 are positioned at sufficient height above the base 1 to permit both frames to lie beneath the bars.

In the operation of the cutter, the article to be cut is placed upon the grating bars 2 and the cutter frame is swung downwardly to cause the blades 13 and 14 to pass through the article and cut the same into slices. The blades pass completely through the article and when the cutter frame is again swung upwardly the slices are engaged by the blades and pushed off the rear end of the support. The rear ends 2ª of the bars 2 being preferably curved downwardly to facilitate the discharge of the slices. In the operation of the cutter, the frame 8 may be used independently of the frame 9 in which case, the frame 9 remains in a position adjacent the base 1, as shown in full lines in Fig. 1. When the cutter frame 8 is used alone, slices may be cut which have a thickness corresponding to the distance between the staggered blades 13 and 14. If it is desired to cut thinner slices, the frame 9 may be locked to the frame 8 by the head 19 of the pin 18, and the two frames may be swung together from a vertical to a substantially horizontal position below the grating bars 2, cutting slices of half the thickness of those cut by the cutters of a single frame.

In Figs. 1 and 2, the grating bars 2 have been shown upon one side only of the cutter supporting shaft 6, but it is obvious that such supporting bars may be placed upon opposite sides of the cutter supporting shaft 6, as shown in Fig. 3 to permit operation of the cutter in either direction.

In Figs. 3 to 5, I have shown a modified construction in which there is a base 20 similar to the base 1, in the construction above described. Adjacent opposite ends of the base 20, there are two supporting gratings similar to that shown in Figs. 1 and 2 and each of these gratings is formed of parallel bars 21 which have inner ends 22 bent downwardly and secured to the base 20, and outer ends secured to posts 23 extending upwardly from the base, and secured to the forward ends of the bars 21. The opposite sides of the two gratings may be provided with side plates 24 similar to the side plates 5, above described. At the center of the base 20 and between the two supporting gratings are brackets 25 which support a transverse shaft 25, upon which are pivoted two cutter frames 27 and 28. The cutter frames 27 and 28 are of substantially the same construction as the cutter frames 8 and 9 above described, except that the blades 29 of the frame 27 are positioned to enter each of the spaces between the frame bars 21 and the blades 30 of the frame 28 are positioned the same as the blades 29. The blades 30, however, of the frame 28 are of wavy form as shown heretofore, so that slices cut thereby will be wavy. The two frames 27 and 28 are movable independently on the shaft 26 so that either frame may be used independently of the other. A handle 31 is provided which is adapted to be detachably secured to either of the two frames, the handle 31 being provided with a threaded nipple 32, and each of the frames have a threaded socket 33 into which the threaded nipple 32 may be screwed. The frame 27 may be used for cutting straight slices and the frame 28 for cutting wavy slices.

In Fig. 6 of the drawings, there is shown a modified construction in which the arrangement of the cutter blades is somewhat different from that shown in Figs. 1 to 5. The frame 35 has two curved rows of cutter blades, the blades 35 of one row being staggered with respect to the blades 37 of the other row and positioned midway between the blades 37.

Having thus described my invention, I claim:

1. A cutter comprising a base, means for supporting articles to be cut, said means comprising parallel spaced bars above the base, a pair of frames pivoted to swing independently about a common axis toward and from the base and parallel blades fixed in said frames and positioned to pass between said bars, both said frames being movable to positions in which said blades are entirely below the top surfaces of said bars.

2. A cutter comprising a base, a horizontal shaft supported above said base, article supporting means on opposite sides of said shaft, said supporting means comprising spaced horizontal bars supported above said base, and a pair of frames pivoted for independent movement on said shaft, each of said frames having spaced parallel blades adapted to pass between said bars.

3. A cutter comprising a base, a grating for supporting articles to be cut, said grating being formed of parallel bars, means for supporting said bars above said base including spaced posts connected to the base and to the outer ends of said bars, said post projecting above the bars to form a retaining wall for articles on the grating, upright guard plates secured to the outermost of said bars, and a movably mounted cutter frame having side members lying outwardly of said guard plates and blades secured therein which are so positioned as to pass between said bars and posts and to be moved through the spaces between the bars to a position entirely below the top of the grating.

In testimony whereof, I hereunto affix my signature.

CALOGERO RUSSO.